(12) United States Patent
Kishi et al.

(10) Patent No.: US 9,778,096 B2
(45) Date of Patent: Oct. 3, 2017

(54) METHOD OF MEASURING CHARACTERISTICS OF CRYSTAL UNIT

(71) Applicant: FUJITSU LIMITED, Kawasaki-shi, Kanagawa (JP)

(72) Inventors: Masakazu Kishi, Kawasaki (JP); Hajime Kubota, Kawasaki (JP); Masayuki Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 14/875,988

(22) Filed: Oct. 6, 2015

(65) Prior Publication Data

US 2016/0123797 A1  May 5, 2016

(30) Foreign Application Priority Data

Nov. 5, 2014  (JP) ................. 2014-224994

(51) Int. Cl.
  *G01N 21/00* (2006.01)
  *G01H 9/00* (2006.01)
  *G01H 11/08* (2006.01)

(52) U.S. Cl.
  CPC ............... *G01H 9/00* (2013.01); *G01H 11/08* (2013.01)

(58) Field of Classification Search
  CPC ........ G01H 9/00; G01H 11/08; H03H 9/1014; H03H 9/02086; G01D 5/268; G01D 5/34; H02N 1/006; H02N 1/00; H01L 41/053; H01L 41/22; H01L 41/04; A01B 12/006
  See application file for complete search history.

(56) References Cited

U.S. PATENT DOCUMENTS

| | | | | |
|---|---|---|---|---|
| 4,897,541 A | * | 1/1990 | Phillips | G01D 5/268 250/227.21 |
| 2005/0281419 A1 | * | 12/2005 | Miyazaki | H02N 1/006 381/191 |
| 2012/0181899 A1 | * | 7/2012 | Koyama | H03H 9/02086 310/313 R |
| 2012/0212105 A1 | * | 8/2012 | Sekiguchi | H03H 9/1014 310/344 |

FOREIGN PATENT DOCUMENTS

| | | |
|---|---|---|
| JP | 2004-282141 | 10/2004 |
| JP | 2007-285898 | 11/2007 |

* cited by examiner

*Primary Examiner* — Jamil Ahmed
(74) *Attorney, Agent, or Firm* — Staas & Halsey LLP

(57) ABSTRACT

A method of measuring characteristics of a crystal unit, includes: driving a crystal unit having a cover transmitting light, a crystal substrate, a first excitation electrode disposed on a first surface of the crystal substrate facing the cover, and a second excitation electrode disposed on a second surface of the crystal substrate opposite to the first surface; irradiating light to the first excitation electrode through the cover in the driving state of the crystal unit; and measuring vibration characteristics of the crystal unit based on reflected light obtained from the irradiated light.

9 Claims, 15 Drawing Sheets

METHOD OF MEASURING CHARACTERISTICS OF CRYSTAL UNIT

CROSS-REFERENCE TO RELATED APPLICATION

This application is based upon and claims the benefit of priority of the prior Japanese Patent Application No. 2014-224994, filed on Nov. 5, 2014, the entire contents of which are incorporated herein by reference.

FIELD

The embodiments discussed herein are related to a method of measuring the characteristics of a crystal unit.

BACKGROUND

There has been known a surface-mount tuning-fork type crystal unit having an internal illumination and a cover made of a transparent material.

Also, there has been known a laser vibrometer which measures the vibration of a target object by laser light in real time using, for example, a polarization beam splitter. The laser vibrometer detects a vibration frequency of the target object by using the fact that linearly polarized light incident on the target object varies in frequency according to a vibration state of the target object.

In recent years, high-density mounting and miniaturization of components or modules is being progressed to meet the demand of the device miniaturization. There is no exception for a crystal unit serving as a clock source, and its miniaturization has been progressed. Under these circumstances, if a functional defect of the device is deemed to have occurred due to abnormality of the crystal unit, it would be useful if the electrical characteristics of the crystal unit may be measured in a mounted state. This is because, in the high-density mounting structure, peripheral parts may be destroyed when the crystal unit is removed, which makes it difficult to measure the characteristics after extracting only the crystal unit.

In order to measure the electrical characteristics of the crystal unit in the mounted state, it is necessary to incorporate a light source in the crystal unit, but the structure of the crystal unit is complicated. Further, a conventional measurement method is suitable for measurement of a target object which vibrates in a direction of an optical axis of the linearly polarized light, but it is not suitable for measurement of the characteristics of the crystal unit in the mounted state. This is because it is difficult to make the linearly polarized light incident such that the optical axis of the linearly polarized light coincides with the oscillation direction of the crystal unit in the mounted state.

In this regard, in the mounted state of the crystal unit, high impedance probe measurement may be realized. However, along with the recent trend of miniaturization, an integrated circuit (IC) has no terminal allowing the oscillation state to be checked, and the crystal unit has a terminal on the back surface, so that there may be no probing point. Further, in the high-density mounting structure, there may be no location on which a probe is placed physically. In addition, even though the probing point exists, the oscillation state may be changed by simply adding pF capacitance having a slightly low value by using the probe, which may make accurate measurement impossible.

The followings are reference documents.

[Document 1] Japanese Laid-Open Patent Publication No. 2004-282141 and
[Document 2] Japanese Laid-Open Patent Publication No. 2007-285898.

SUMMARY

According to an aspect of the invention, a method of measuring characteristics of a crystal unit, includes: driving a crystal unit having a cover transmitting light, a crystal substrate, a first excitation electrode disposed on a first surface of the crystal substrate facing the cover, and a second excitation electrode disposed on a second surface of the crystal substrate opposite to the first surface; irradiating light to the first excitation electrode through the cover in the driving state of the crystal unit; and measuring vibration characteristics of the crystal unit based on reflected light obtained from the irradiated light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described in detail with reference to the accompanying drawings.

A method of measuring the characteristics of a crystal unit according to an embodiment (Embodiment 1) will be described with reference to FIG. 1A to FIG. 10.

Figure 1A:
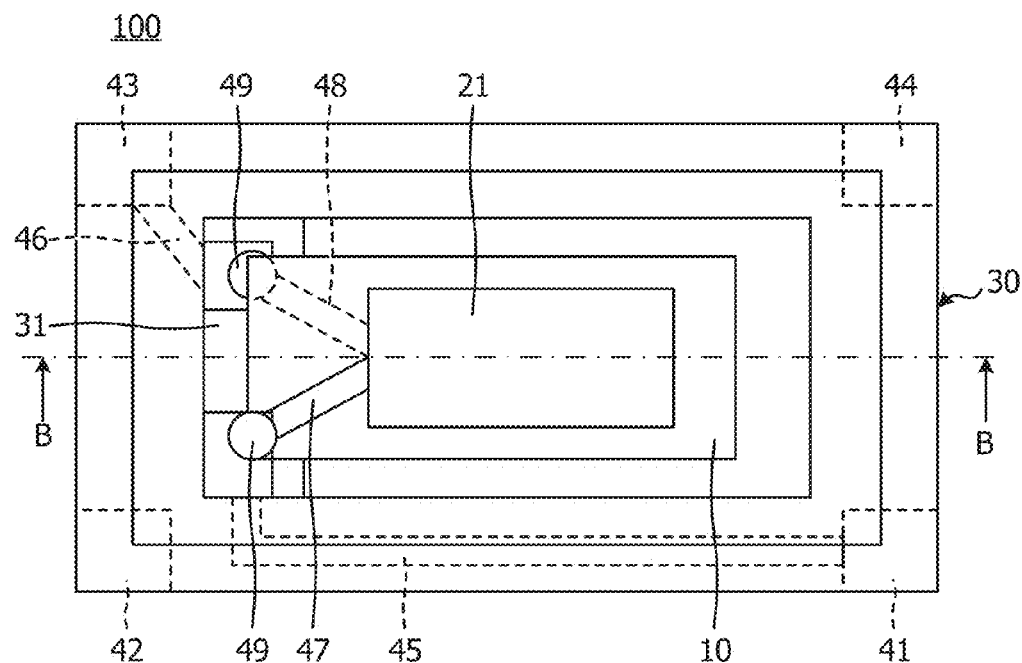
FIGS. 1A and 1B are a top view and a cross-sectional view, respectively, schematically illustrating a crystal unit 100 according to one example.
Figure 1B:
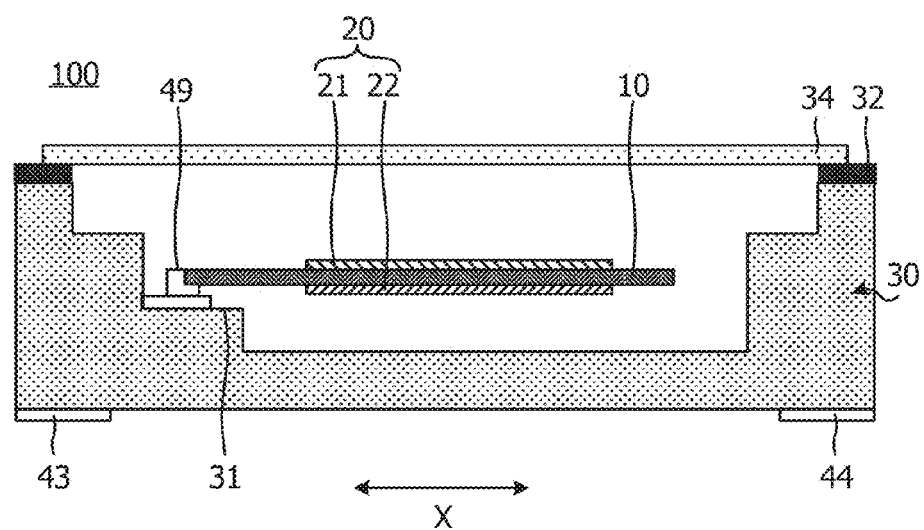

FIGS. 1A and 1B are schematic views illustrating a crystal unit 100 according to one example, which is suitable for applying the method of measuring the characteristics according to Embodiment 1, FIG. 1A being a top view and FIG. 1B being a cross-sectional view taken along line B-B in FIG. 1A. In FIG. 1A, a cover of a case 30 is not illustrated to allow the interior of the crystal unit 100 to be viewed. In the following description, it is assumed that a thickness direction (a vertical direction in FIG. 1B) of a crystal piece 10 is a vertical direction and a side in which the cover of the case 300 is present is an "upper side." However, the direction of the crystal unit 100 in a mounted state is optional. In addition, as illustrated in FIG. 1B, the X direction refers to a direction corresponding to a vibration direction of the crystal unit 100.

The crystal unit 100 includes a crystal piece 10, an excitation electrode 20, a case 30, and external electrodes 41 to 44. The crystal unit 100 is of a surface-mount type crystal unit as illustrated in FIGS. 1A and 1B.

The crystal piece 10 may be, for example, an AT cut synthetic crystal substrate. The crystal piece 10 may be supported by a cantilever structure in the case 30. In the example illustrated in FIGS. 1A and 1B, the crystal piece 10 is supported on a bank part by a cantilever structure. In the example illustrated in FIGS. 1A and 1B, when driving the crystal unit 100, the crystal piece 10 vibrates in the X direction (thickness-shear vibration). In addition, the crystal piece 10 may be supported by a cantilever structure at the end in a direction perpendicular to the X direction.

The excitation electrode 20 excites the crystal piece 10. The excitation electrode 20 includes an upper excitation electrode (an example of a first excitation electrode 21) provided on the upper surface of the crystal piece 10 and a lower excitation electrode (an example of a second excitation electrode 22) provided on the lower surface of the crystal piece 10. At the time of driving the crystal unit 100, the crystal piece 10 is excited by a potential difference between the upper excitation electrode 21 and the lower excitation electrode 22.

The excitation electrode 20 is formed of a material which reflects light. The excitation electrode 20 may be formed of, such as for example, gold, silver, aluminum.

The case 30 accommodates the crystal piece 10. The case 30 is made of, for example, a ceramic material. The case 30 includes a cover 34 to airtightly seal its inner space in which the crystal piece 10 is disposed. For example, the inner space of the case 30 is sealed with the cover 34 in a vacuum state or while being filled with dry nitrogen.

The cover 34 is formed of a material which transmits light. The cover 34 may be formed of a glass plate, or may be formed of translucent ceramics.

The external electrodes 41 to 44 are provided in the case 30. In the example illustrated in FIGS. 1A and 1B, the external electrodes 41 to 44 are provided on the outer surface of the bottom of the case 30. The external electrodes 41 and 43 are electrically connected to the upper excitation electrode 21 and the lower excitation electrode 22, respectively. In the example illustrated in FIGS. 1A and 1B, the external electrode 41 is electrically connected to the upper excitation electrode 21 via a conductor pattern 45 formed on an inner layer of the case 30 and a conductor pattern 47 formed on the upper surface of the crystal piece 10. The conductor pattern 45 has both ends exposed from the inner layer to the surface of the case 30, with one end electrically connected to the external electrode 41 and the other end electrically connected to the conductor pattern 47 by a conductive adhesive 49.

Similarly, the external electrode 43 is electrically connected to the lower excitation electrode 22 via a conductor pattern 46 formed on the inner layer of the case 30 and a conductor pattern 48 formed on the lower surface of the crystal piece 10. The conductor pattern 46 has both ends exposed from the inner layer to the surface of the case 30, with one end electrically connected to the external electrode 43 and the other end electrically connected to the conductor pattern 48 by the conductive adhesive 49. The conductive adhesive 49 is provided at an edge of the crystal piece 10 (an edge of a cantilever-supported side). In the example illustrated in FIGS. 1A and 1B, the external electrodes 42 and 44 may be omitted.

Figure 2:
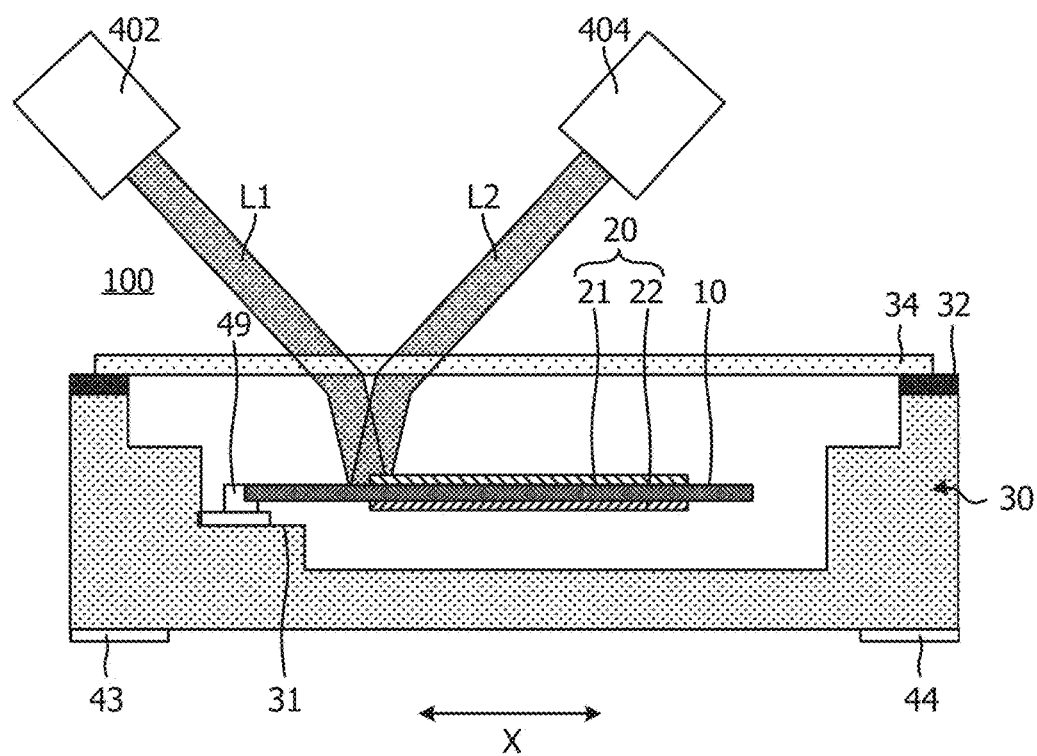
FIG. 2 is a view for explaining a method of measuring the characteristics of the crystal unit 100.
Figure 3:
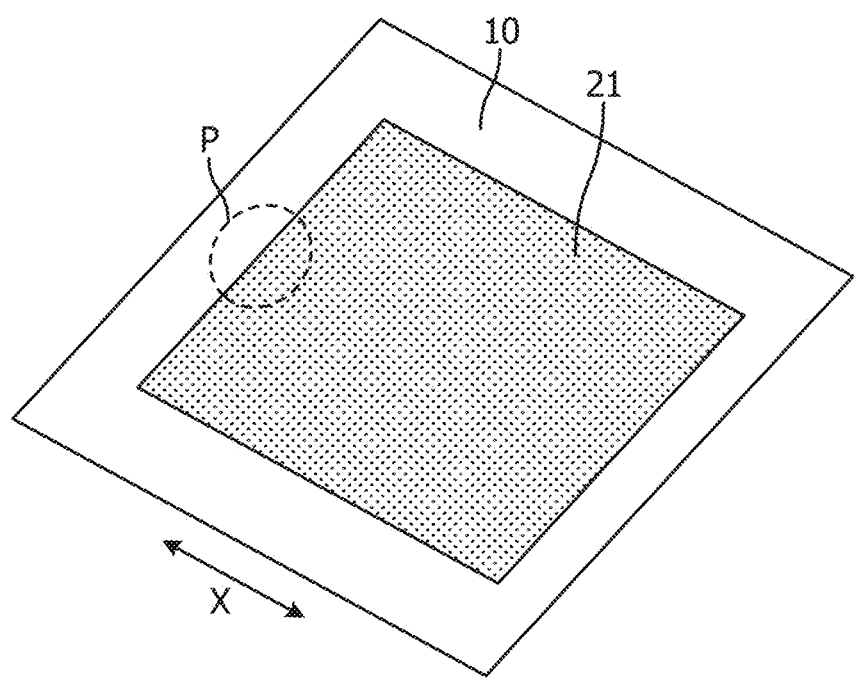
FIG. 3 is a perspective view schematically illustrating an irradiation portion P of light L1 from a light source 402.

FIG. 2 illustrates a method of measuring the characteristics of the crystal unit 100, and is a partial cross-sectional view schematically illustrating a state when measuring the characteristics. FIG. 3 is a perspective view schematically illustrating an irradiation portion P to which light L1 is irradiated from a light source 402.

The measurement of the characteristics of the crystal unit 100 may be performed while driving the crystal unit 100 in a mounted state. Specifically, the light source 402 is disposed above the cover 34, and the light L1 is irradiated to the upper excitation electrode 21 through the cover 34. Further, during the irradiation, a positional relationship between the light source 402 and the crystal unit 100 is fixed. As the light source 402, an arbitrary light source may be used, but a laser light source is used in the following case. The light L1 is irradiated to the upper excitation electrode 21 through the cover 34. In this case, the irradiation portion (a spot of laser light) P includes, as illustrated in FIG. 3, an edge of the upper excitation electrode 21 and a portion of the crystal piece 10 adjacent to the edge in the X direction. That is, the light source 402 simultaneously irradiates an edge of the upper excitation electrode 21 and a portion of the crystal piece 10 adjacent to the edge in the X direction.

Upon irradiation of the light L1 to the upper excitation electrode 21, the upper excitation electrode 21 reflects the light as described above to generate reflected light L2. On the other hand, the crystal piece 10 fails to substantially reflect light because the light is transmitted through the crystal piece 10. Thus, the reflected light L2 is generated substantially by the upper excitation electrode 21. The reflected light L2 is incident on a light receiver (light detector) 404 which is disposed above the cover 34. That is, the light receiver 404 is disposed above the cover 34 to receive the reflected light L2 from the upper excitation electrode 21.

Figure 4A:
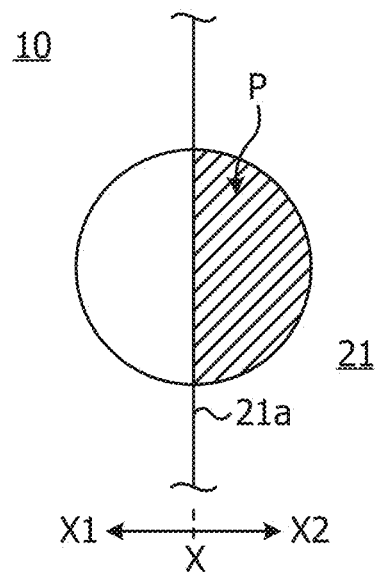
FIGS. 4A to 4C are views for explaining the principle of measuring the characteristics of the crystal unit 100.
Figure 4B:
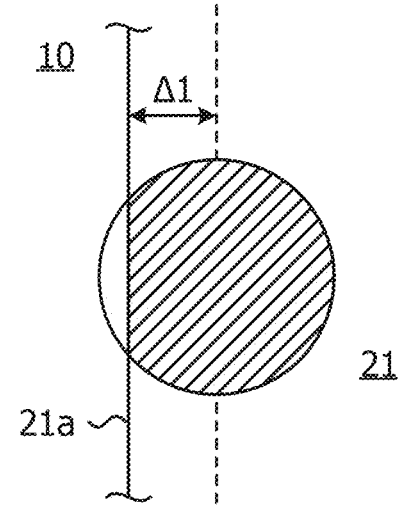
Figure 4C:
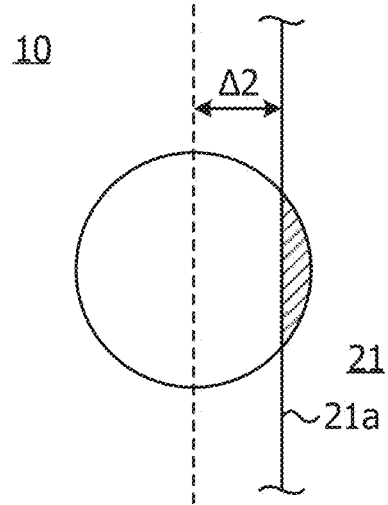

FIGS. 4A to 4C are views for explaining the principle of measuring the characteristics of the crystal unit 100, and show a relationship between the irradiation portion P and an edge boundary 21a of the upper excitation electrode 21. In FIGS. 4A to 4C, a portion relating to the upper excitation electrode 21 in the irradiation portion P is represented by a "hatched area."

During the driving of the crystal unit 100, the area of the portion relating to the upper excitation electrode 21 in the irradiation portion P changes in accordance with the vibration of the crystal piece 10 as illustrated in FIGS. 4A to 4C. For example, as illustrated in FIG. 4B, when the position of the crystal piece 10 is displaced by Δ1 toward an X1 side of the X direction in comparison with the state illustrated in FIG. 4A due to the vibration of the crystal piece 10, the area of the portion relating to the upper excitation electrode 21 in the irradiation portion P increases in comparison with the state illustrated in FIG. 4A. In this case, the amount of the reflected light L2 received by the light receiver 404 increases in comparison with the state illustrated in FIG. 4A. On the other hand, as illustrated in FIG. 4C, when the position of the crystal piece 10 is displaced by Δ2 toward an X2 side of the X direction in comparison with the state illustrated in FIG. 4A due to the vibration of the crystal piece 10, the area of the portion relating to the upper excitation electrode 21 in the irradiation portion P decreases in comparison with the state illustrated in FIG. 4A. In this case, the amount of the reflected light L2 received by the light receiver 404 decreases in comparison with the state illustrated in FIG. 4A. Thus, the amount of the reflected light L2 received by the light receiver 404 changes in accordance with the vibration of the crystal piece 10. Therefore, the frequency of temporal variation of the amount of the reflected light L2 corresponds to the oscillation frequency of the crystal piece 10.

Figure 5:
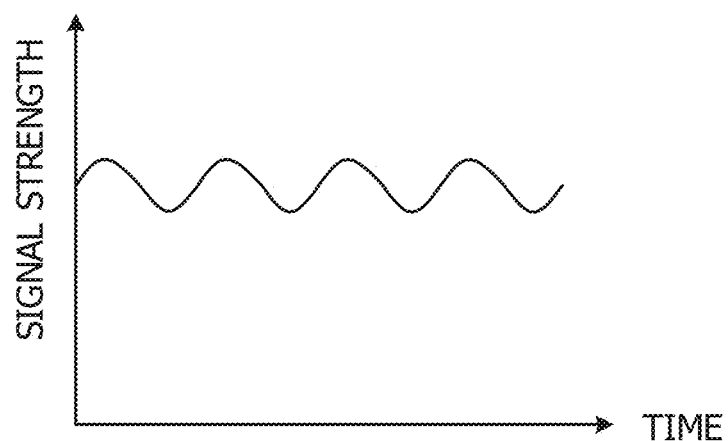
FIG. 5 is a diagram illustrating a time-series waveform of the amount of reflected light L2 received by a light receiver 404.

FIG. 5 is a diagram illustrating a time-series waveform of the amount of the reflected light L2 received by the light receiver 404. In FIG. 5, the amount of the reflected light L2 received by the light receiver 404 is represented as the intensity (signal strength) of a received light signal.

The amount of the reflected light L2 received by the light receiver 404 changes in accordance with the vibration of the crystal piece 10 as described above with reference to FIGS. 4A to 4C. Consequently, the amount of the reflected light L2 received by the light receiver 404 changes in accordance with the vibration characteristics of the crystal piece 10. Specifically, the frequency of temporal variation of the amount of the reflected light L2 corresponds to the oscillation frequency of the crystal piece 10. Therefore, by analyzing the frequency of temporal variation of the amount of the reflected light L2, it is possible to measure the oscillation frequency of the crystal unit 100. For example, in the received light signal relating to the reflected light L2 received by the light receiver 404, a DC component is cut by, for example, a capacitor, and an AC component is amplified by an amplifier. Based on the amplified AC component, the frequency (oscillation frequency of the crystal unit 100) is measured (analyzed) by a measuring device (e.g., an oscilloscope) (not illustrated).

Thus, according to the method of measuring the characteristics according to Embodiment 1, by irradiating light to the upper excitation electrode 21 of the crystal unit 100 and analyzing the reflected light, the oscillation frequency of the crystal unit 100 may be measured from the outside. Therefore, for example, the oscillation frequency of the crystal unit 100 in the mounted state may also be measured. As the oscillation frequency becomes measurable, it is possible to compare the characteristics with those of good quality products.

Figure 6:
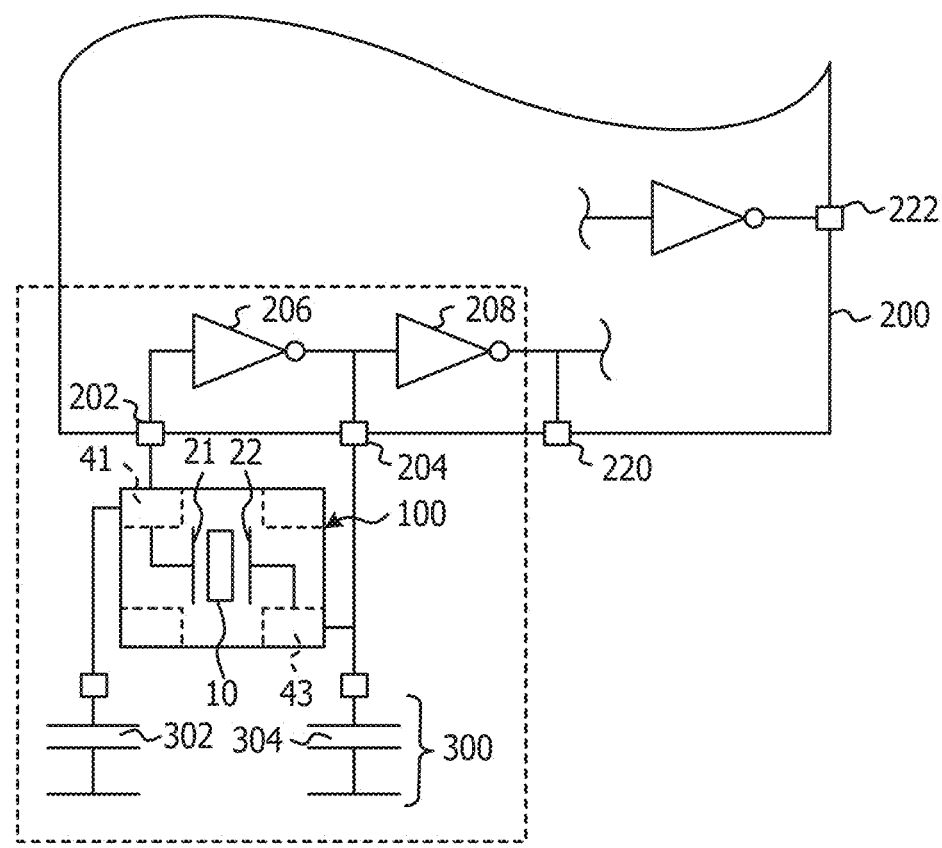
FIG. 6 is a diagram schematically illustrating an example of a circuit configuration incorporating the crystal unit 100.

FIG. 6 is a diagram schematically illustrating an example of a circuit configuration incorporating the crystal unit 100.

In the example illustrated in FIG. 6, the crystal unit 100 is connected to an integrated circuit (IC) 200. That is, the external electrodes 41 and 43 of the crystal unit 100 are connected to an input terminal 202 and an output terminal 204 of the IC 200, respectively. The crystal unit 100 generates a clock to be used in the IC 200. The IC 200 includes an inverting amplifier 206 and an output buffer 208. A signal inputted to the input terminal 202 is inverted and amplified by the inverting amplifier 206. The inverted and amplified signal is inputted to the output buffer 208 and supplied to the upper excitation electrode 21 via the external electrode 43. Further, in the example illustrated in FIG. 6, the arrangement of the upper excitation electrode 21 and the lower excitation electrode 22 may be reversed.

A matching capacitor 300 is connected to the crystal unit 100. Specifically, a first capacitor 302 is connected between the ground and the external electrode 41 of the crystal unit 100, and a second capacitor 304 is connected between the ground and the external electrode 43 of the crystal unit 100. In FIG. 6, with respect to the IC 200, for example, the capacitance in the terminal, the stray capacitance of a wiring pattern of the mounting board, and the resistance which limits the current flowing in the crystal unit 100 are not illustrated. The matching capacitor 300 is provided for a matching adjustment to adjust the oscillation frequency of the crystal unit 100 to a desired value (design value) when the total capacitance (load capacitance) including the IC 200 is loaded from the crystal unit 100. Further, in FIG. 6, a range surrounded by a dotted line constitutes an oscillation circuit.

The IC 200 may include terminals 220 and 222 monitoring the oscillating circuit, but the terminals 220 and 222 may be omitted. This is because it is possible to measure (monitor) the oscillation frequency of the crystal unit 100 by irradiating light to the upper excitation electrode 21 and analyzing the reflected light as described above. Therefore, according to the method of measuring the characteristics according to Embodiment 1, the terminals 220 and 222 are unnecessary and the IC 200 may be simplified.

Figure 7:
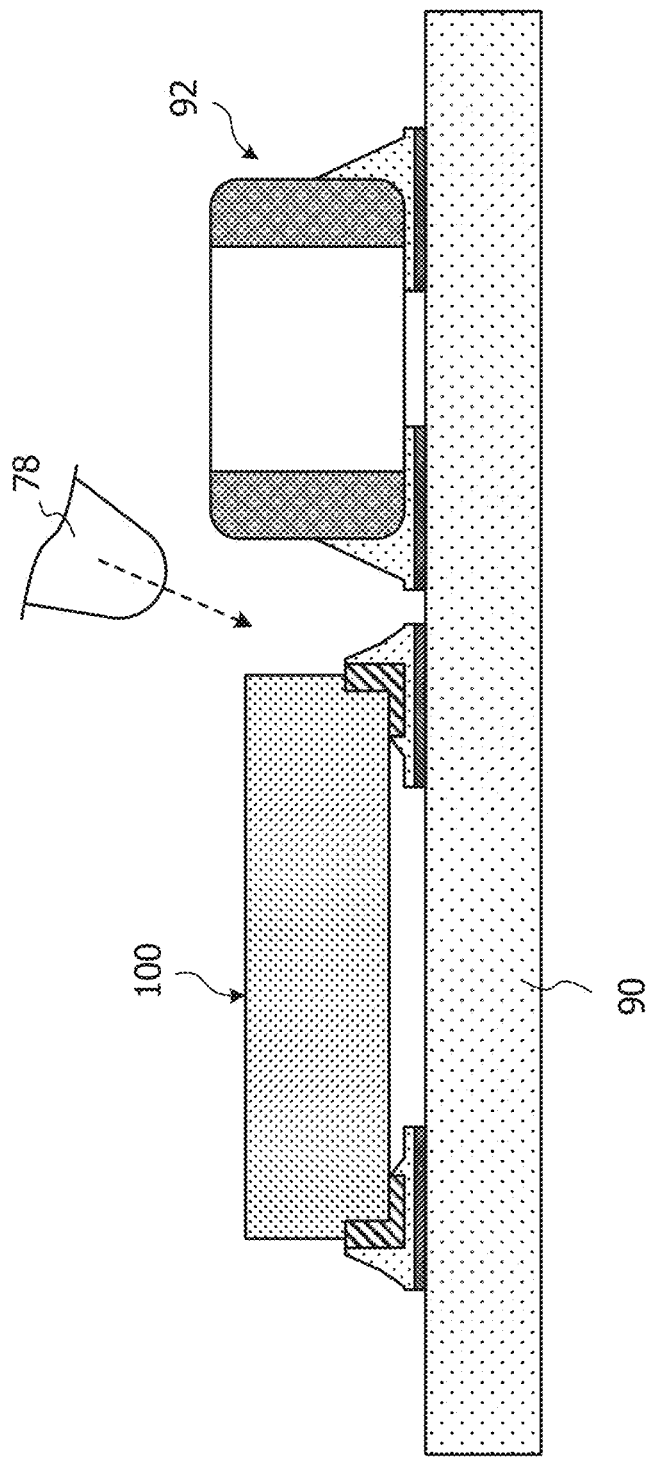
FIG. 7 is a diagram illustrating an example of a mounted state of the crystal unit 100.

FIG. 7 is a diagram illustrating an example of a mounted state of the crystal unit 100.

The crystal unit 100 may be mounted on a substrate 90 as illustrated in FIG. 7. In the example illustrated in FIG. 7, peripheral parts 92 are mounted in the vicinity of the crystal unit 100.

In recent years, high-density mounting and miniaturization of components or modules is being progressed to meet the demand of the device miniaturization. There is no exception for the crystal unit serving as a clock source. For example, a miniaturization has progressed to a size of 3.2×2.5 mm, 2.5×2.0 mm, and 2.0×1.6 mm. Under these circumstances, if a functional defect of the device is deemed to have occurred due to abnormality of the crystal unit, it would be useful if the electrical characteristics of the crystal unit may be measured in the mounted state. This is because, in the high-density mounting structure, the measurement after extracting only the crystal unit involves a risk of destroying the peripheral parts when the crystal unit is removed.

In this regard, in the mounted state of the crystal unit 100, high impedance probe measurement may be realized. However, along with the recent miniaturization, the IC 200 may have no terminal (see the terminals 220 and 222 of FIG. 4) allowing the oscillation state to be checked, and a terminal may be hidden in the back surface of an IC package by ball grid array (BGA) packaging. In addition, the matching capacitor 300 is incorporated into the IC 200 and the crystal unit 100 has a terminal on the back surface, so that there may be no probing point. Further, in the high-density mounting structure, as illustrated schematically in FIG. 7, there may be no location on which a probe 78 is placed physically. In addition, even though the probing point exists, if a margin is insufficient in the design of the oscillation circuit, the oscillation state may be changed (oscillation is changed to non-oscillation, or vice versa) only by adding pF capacitance having a slightly low value by using the probe 78, which may make accurate measurement impossible.

According to the method of measuring the characteristics according to Embodiment 1, as described above, even when the probe measurement is impossible or difficult, the oscillation frequency of the crystal unit 100 may be accurately measured.

Next, an upper excitation electrode according to another example, which may replace the upper excitation electrode 21 of the crystal unit 100 illustrated in FIGS. 1A and 1B, will be described.

Figure 8:
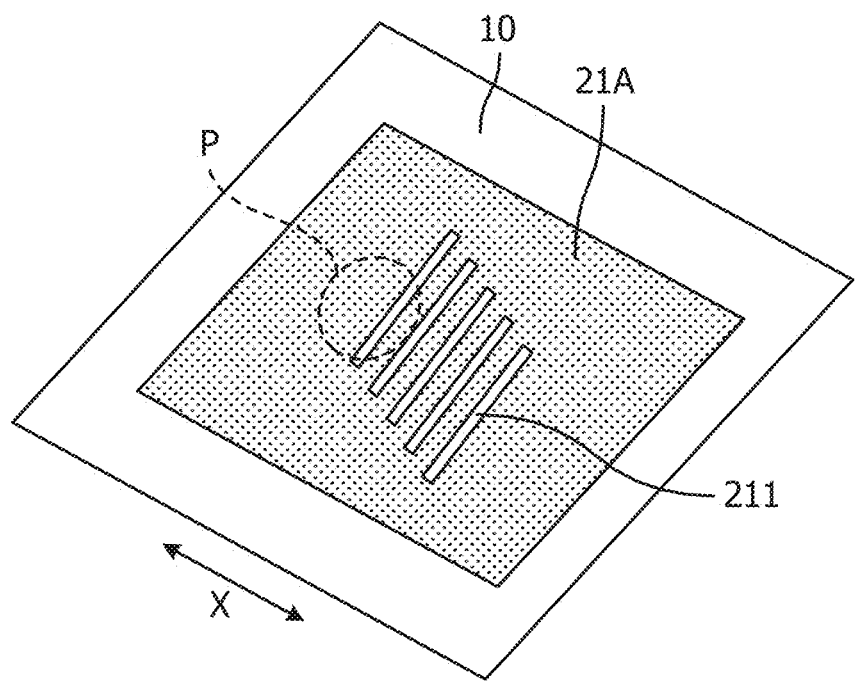
FIG. 8 is a perspective view illustrating an upper excitation electrode 21A according to another example.

FIG. 8 is a perspective view illustrating an upper excitation electrode 21A according to another example. In FIG. 8, only the crystal piece 10 and the upper excitation electrode 21A are illustrated, and the irradiation portion P to which the light L1 is irradiated from the light source 402 (see, e.g., FIG. 2) is further illustrated.

In the example illustrated in FIG. 8, the upper excitation electrode 21A has a plurality of slits (an example of a hole) 211. The slits 211 penetrate through the upper excitation electrode 21A. In the example illustrated in FIG. 8, the slits 211 are elongated holes perpendicular to the X direction. However, a longitudinal direction of the slits 211 may be inclined with respect to a direction perpendicular to the X direction, or may be parallel to the X direction.

As illustrated in FIG. 8, the irradiation portion P includes an edge around the slits 211 of the upper excitation electrode 21A and a portion of the crystal piece 10 adjacent to the edge in the X direction. That is, the light source 402 simultaneously irradiates the edge around the slits 211 of the upper excitation electrode 21A and the portion of the crystal piece 10 adjacent to the edge in the X direction. Accordingly, the amount of the reflected light L2 changes over time with the vibration of the crystal piece 10 (see, e.g., FIG. 10), and it is possible to measure the oscillation frequency of the crystal unit 100.

Further, in the example illustrated in FIG. 8, five slits 211 are formed in the same shape, but the number or shape of the slits 211 is optional. The slits 211 are formed for the purpose of changing the area of the portion of the upper excitation electrode 21A in the irradiation portion P in accordance with the vibration of the crystal piece 10 as described above. Thus, the plurality of slits 211 are preferably formed such that all of the slits 211 are set to be held within a range included at least temporarily in the irradiation portion P during the vibration of the crystal piece 10 in the upper excitation electrode 21A.

Figure 9:
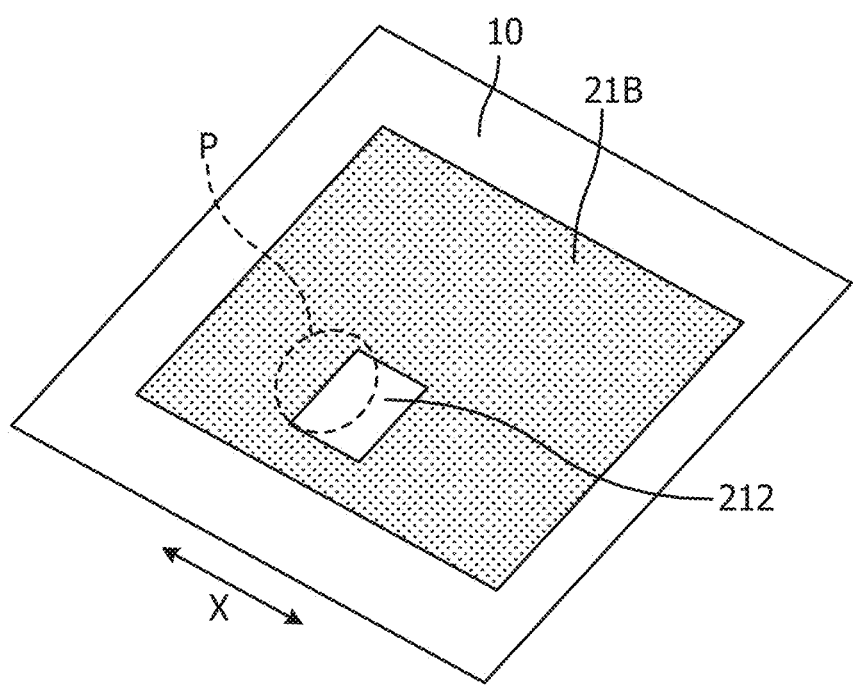
FIG. 9 is a perspective view illustrating an upper excitation electrode 21B according to another example.

FIG. 9 is a perspective view illustrating an upper excitation electrode 21B according to another example. In FIG. 9, only the crystal piece 10 and the upper excitation electrode 21B are illustrated, and the irradiation portion P to which the light L1 is irradiated from the light source 402 (see, e.g., FIG. 2) is further illustrated.

In the example illustrated in FIG. 9, the upper excitation electrode 21B has a single hole 212. The hole 212 penetrates through the upper excitation electrode 21B.

As illustrated in FIG. 9, the irradiation portion P includes an edge around the hole 212 of the upper excitation electrode 21B and a portion of the crystal piece 10 adjacent to the edge in the X direction. That is, the light source 402 simultaneously irradiates the edge around the hole 212 of the upper excitation electrode 21B and the portion of the crystal piece 10 adjacent to the edge in the X direction. Accordingly, the amount of the reflected light L2 changes over time in accordance with the vibration of the crystal piece 10 (see, e.g., FIG. 10), and it is possible to measure the oscillation frequency of the crystal unit 100.

Figure 10:
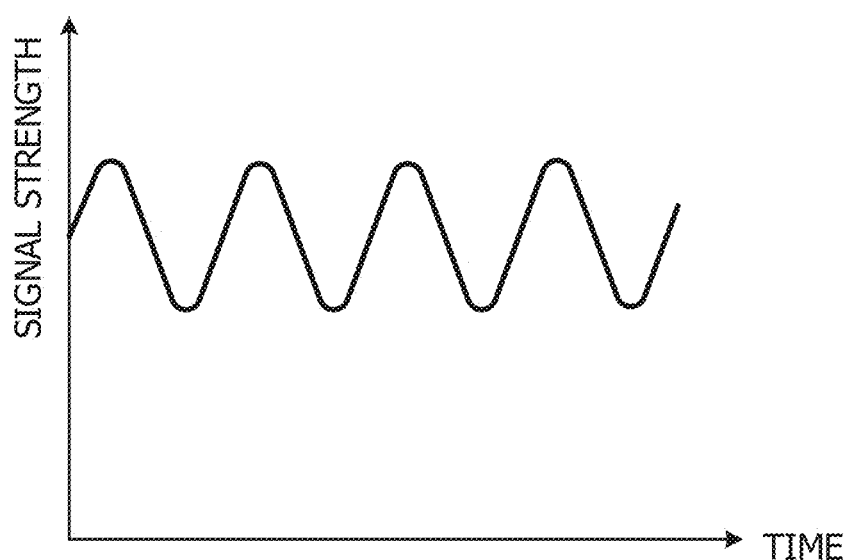
FIG. 10 is a diagram illustrating a time-series waveform of the amount of the reflected light L2 received by the light receiver 404 in the examples illustrated in FIGS. 8 and 9.

FIG. 10 is a diagram illustrating a time-series waveform of the amount of the reflected light L2 received by the light receiver 404 in the examples illustrated in FIGS. 8 and 9. In FIG. 10, the amount of the reflected light L2 received by the light receiver 404 is represented as the intensity (signal strength) of a received light signal.

According to the examples illustrated in FIGS. 8 and 9, as may be seen by comparing FIG. 10 with FIG. 5, it is possible to increase the amplitude of temporal variation of the amount of the reflected light L2 received by the light receiver 404. This is because the crystal piece 10 is generally configured such that a displacement in the central portion in the X direction is greater than the peripheral portion during the vibration of the crystal piece 10 in order for a central portion with high charge density is to be more deformed (vibrated) than a peripheral portion. For this purpose, preferably, the slits 211 and the hole 212 are formed in the vicinity of the central portion in the X direction in the upper excitation electrodes 21A and 21B. In other words, the slits 211 and the hole 212 are formed such that the irradiation portion P is located in the vicinity of the central portion in the X direction in the upper excitation electrodes 21A and 21B. Further, the slits 211 and the hole 212 are preferably formed at the ends of the upper excitation electrodes 21A and 21B in the direction perpendicular to the X direction so as not to affect the vibration characteristics of the crystal unit 100.

Next, a method of measuring the characteristics according to another embodiment (Embodiment 2) will be described with reference to FIG. 11A to FIG. 15.

A crystal unit 100C, which is suitable for applying the method of measuring the characteristics according to Embodiment 2, is different from the crystal unit 100 illustrated in FIGS. 1A and 1B in the configuration of an upper excitation electrode and a lower excitation electrode. Other components of the crystal unit 100C may be the same as the components of the crystal unit 100 illustrated in FIGS. 1A and 1B, and descriptions thereof will be omitted.

Figure 11A:
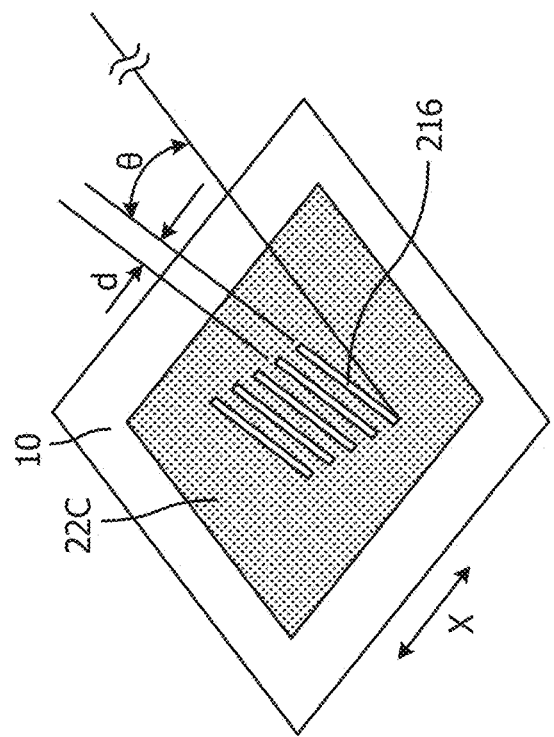
FIGS. 11A and 11B are views illustrating an upper excitation electrode 21C and a lower excitation electrode 22C according to one example.
Figure 11B:
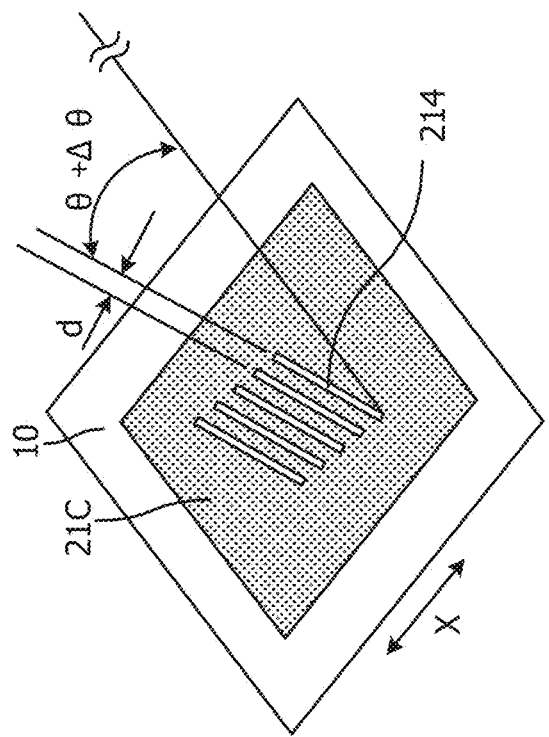

FIGS. 11A and 11B are views illustrating an upper excitation electrode 21C and a lower excitation electrode 22C according to one example, FIG. 11A being a top perspective view of the crystal piece 10 and FIG. 11B being a bottom perspective view of the crystal piece 10. In FIGS. 11A and 11B, only the crystal piece 10, the upper excitation electrode 21C and the lower excitation electrode 22C are illustrated.

As illustrated in FIG. 11A, the upper excitation electrode 21C is different from the upper excitation electrode 21 of the crystal unit 100 illustrated in FIGS. 1A and 1B in that a plurality of first slits 214 are formed to extend in a first direction. The longitudinal direction (first direction) of the first slits 214 is inclined by a first angle α (that is, θ+Δθ)) with respect to the X direction. The first angle α is preferably an angle of 45 degrees or less. The first slits 214, which are adjacent and parallel to each other, are formed to be spaced from each other at a predetermined interval (pitch) d.

As illustrated in FIG. 11B, the lower excitation electrode 22C is different from the lower excitation electrode 22 of the crystal unit 100 illustrated in FIGS. 1A and 1B in that a plurality of second slits 216 are formed to extend in a second direction. The longitudinal direction (second direction) of the second slits 216 is inclined by a second angle β (that is, θ≠α) with respect to the X direction. The second angle β is preferably an angle of 45 degrees or less. The second slits 216, which are adjacent and parallel to each other, are formed to be spaced from each other at a predetermined interval (pitch) d. In the example illustrated in FIGS. 11A and 11B, the pitch d between the second slits 216 is the same as the pitch d between the first slits 214, but may be different. Further, in the example illustrated in FIGS. 11A and 11B, both the first angle α and the second angle β are not zero, but either one may be zero.

The second slits 216 intersect the first slits 214 when viewed in a direction perpendicular to the surface of the crystal piece 10. The second slits 216 and the first slits 214 are preferably formed such that two or more second slits 216 intersect one first slit 214 when viewed in the direction perpendicular to the surface of the crystal piece 10.

Figure 12:
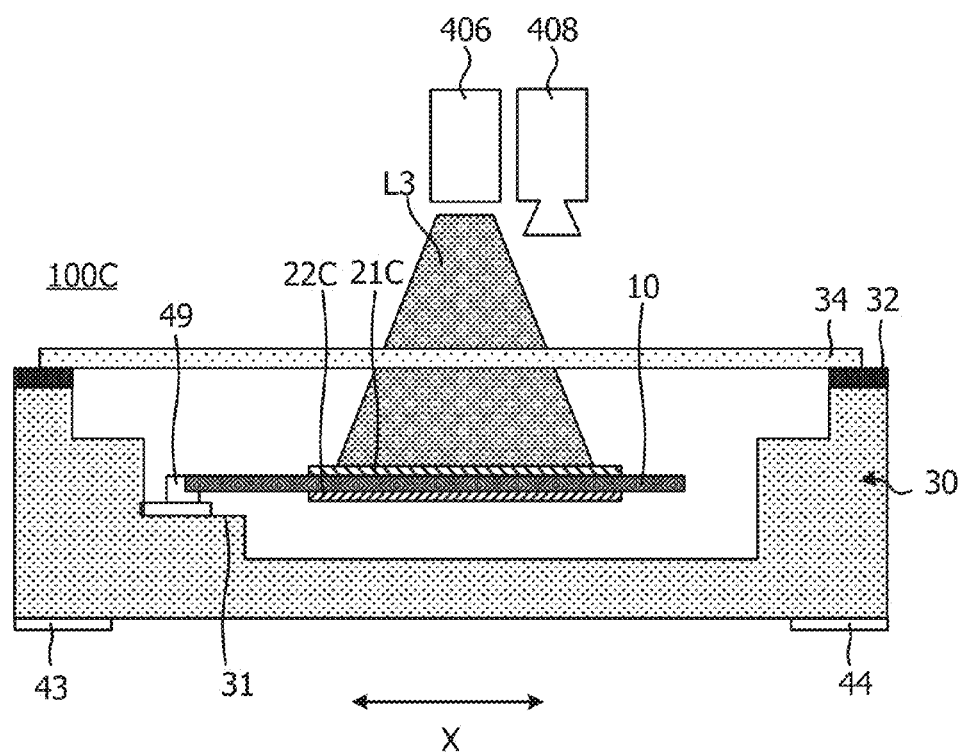
FIG. 12 is a view for explaining a method of measuring the characteristics of a crystal unit 100C.
Figure 13:
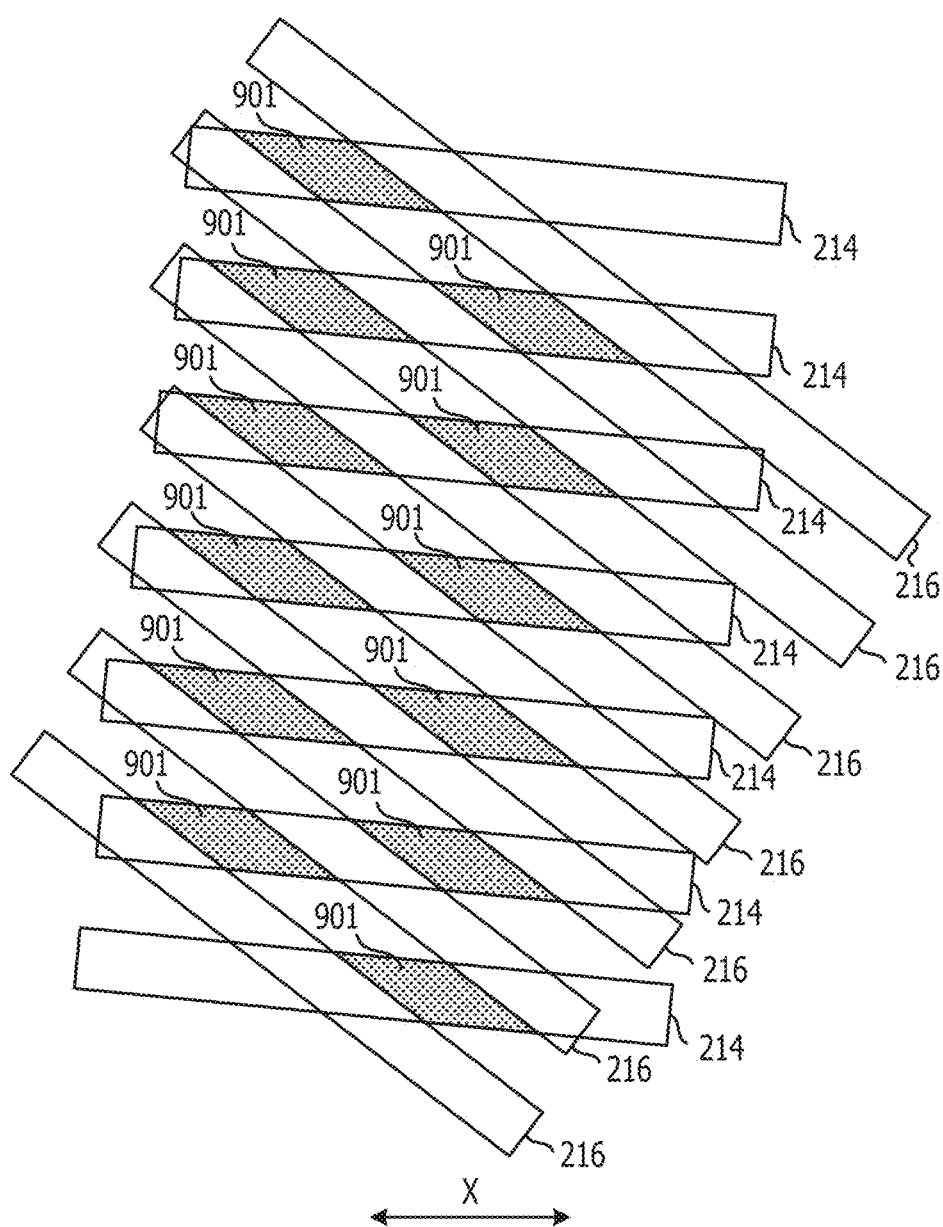
FIG. 13 is a view for explaining the principle of observing moire fringes.

FIG. 12 is a view for explaining a method of measuring the characteristics of the crystal unit 100C, and is a partial cross-sectional view schematically illustrating a state when measuring the characteristics. FIG. 13 is a view for explaining the principle of observing moire fringes, and represents reflection portions of the lower excitation electrode 22C as hatched areas 901 when viewed in the direction perpendicular to the surface of the crystal piece 10. FIG. 13 is a perspective view illustrating a relationship between the first slits 214 and the second slits 216. In FIG. 13, the number and shape of the first slits 214 and the second slits 216 are illustrated differently from the number and shape illustrated in FIG. 11 for the convenience of explanation of the observation principle.

The measurement of the characteristics of the crystal unit 100C may be performed while driving the crystal unit 100C in a mounted state. Specifically, a light source 406 is disposed above the cover 34, and light L3 is irradiated to the upper excitation electrode 21C through the cover 34. Further, during the irradiation, a positional relationship between the light source 406 and the crystal unit 100C is fixed. As the light source 406, an arbitrary light source may be used, but a light emitting diode (LED) is used in the following case. The light L3 is irradiated to the upper excitation electrode 21C through the cover 34. In this case, an irradiation portion includes a range in which the first slits 214 of the upper excitation electrode 21C are formed. The irradiation portion preferably includes the entire range in which the first slits 214 of the upper excitation electrode 21C are formed, but may include only a part of the range.

Upon irradiation of the light L3 to the upper excitation electrode 21C, the upper excitation electrode 21C reflects the light as described above to generate reflected light (not illustrated). In contrast, the crystal piece 10 fails to substantially reflect light because the light is transmitted through the crystal piece 10. Further, the lower excitation electrode 22C reflects the light as described above to generate reflected light (not illustrated) from the light L3 which is incident through the first slits 214. In this case, the reflection portions of the lower excitation electrode 22C are portions where the second slits 216 are not formed. The reflection portions of the lower excitation electrode 22C are arranged in a direction substantially perpendicular to the first slits 214 as illustrated schematically in FIG. 13. Consequently, moire fringes due to the first slits 214 and the second slits 216 may be observed by a camera (light detector) 408 which is disposed above the cover 34 when viewed in a direction perpendicular to the surface of the crystal piece 10. That is, the camera 408 is disposed above the cover 34 to capture an image of the moire fringes formed when illuminating the upper excitation electrode 21C.

Figure 14A:
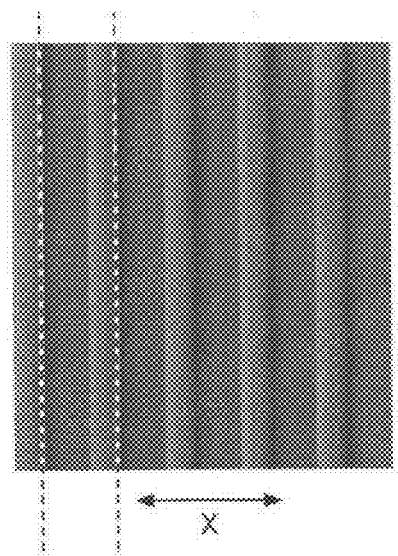
FIGS. 14A to 14C are views for explaining a relationship between the oscillation state of the crystal unit 100C and the moire fringes observed by a camera 408.
Figure 14B:
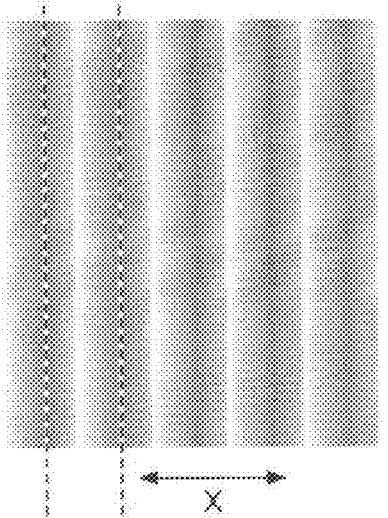
Figure 14C:
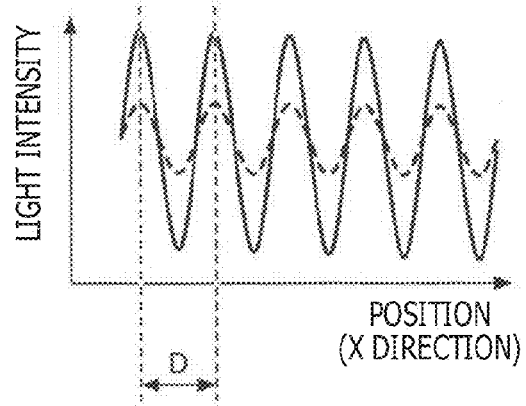

FIGS. 14A to 14C illustrate a relationship between the vibration state of the crystal unit 100C and the moire fringes observed by the camera 408. FIG. 14A schematically shows the moire fringes when the amplitude of vibration of the crystal unit 100C is small, and FIG. 14B schematically shows the moire fringes when the amplitude of vibration of the crystal unit 100C is large. In FIGS. 14A and 14B, a difference in the gray density of the hatching represents a difference in the density of the moire fringes, and dark gray indicates that the amount of light is large. Further, in FIG. 14C, a difference in density of the moire fringes is schematically illustrated in a graph. In the example illustrated in FIGS. 14A and 14B, stripes of the moire fringes are formed such that a longitudinal direction of the moire fringes becomes a direction perpendicular to the X direction, but the longitudinal direction of the moire fringes may be inclined with respect to the X direction. In this case, an inclination angle may be an angle of 45 degrees or less.

A distance D between the moire fringes observed by the camera 408 is represented by the following equation: $D=d\{d/2\ \sin(\Delta\theta/2)\} \approx d/\Delta\theta$ where $\Delta\theta$ is a very small angle.

In the moire fringes observed by the camera 408, as illustrated in FIGS. 14A to 14C, the density is different depending on the vibration state of the crystal unit 100C. Specifically, as illustrated in FIG. 14A, when the amplitude of vibration of the crystal unit 100C is relatively small, the contrast of the moire fringes is relatively high. In other words, the density of the moire fringes observed by the camera 408 becomes relatively denser. In contrast, as illustrated in FIG. 14B, when the amplitude of vibration of the crystal unit 100C is relatively large, the contrast of the moire fringes is relatively low. In other words, the density of the moire fringes observed by the camera 408 becomes relatively thinner. This is because when the upper excitation electrode 21C oscillates in the X direction in accordance with the vibration of the crystal unit 100C, portions (see, e.g., the hatched areas 901 in FIG. 13) of the lower excitation electrode 22C viewed from the camera 408 through the first slits 214 oscillate in the X direction.

In FIG. 14C, the light intensity when the amplitude of vibration of the crystal unit 100C is relatively small is indicated by a solid line, and the light intensity when the amplitude of vibration of the crystal unit 100C is relatively large is indicated by a dotted line. In a state where the portions of the lower excitation electrode 22C viewed from the camera 408 oscillate in the X direction, as illustrated in FIG. 14C, the intensity of light that may be received by one pixel of the camera 408 per unit time decreases as the amplitude of vibration of the crystal unit 100C increases. Therefore, it may be seen that the vibration state (particularly, the amplitude) of the crystal unit 100C may be evaluated (measured) by analyzing the density of the moire fringes observed by the camera 408. For example, based on the captured image obtained by the camera 408, a histogram (see, e.g., FIG. 14C) of the light intensity (luminance value) at each position in the X direction is generated, and the light intensity at a peak position is calculated.

Figure 15:
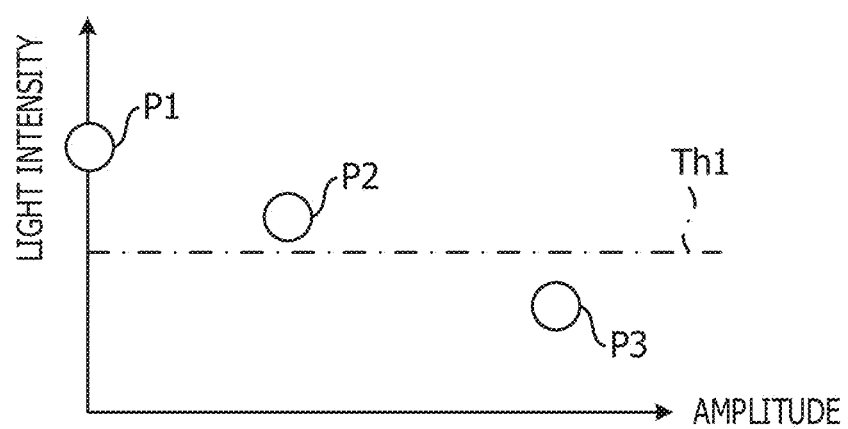
FIG. 15 is a view illustrating an example of a method of determining the abnormality of the crystal unit 100C based on the density (light intensity) of the moire fringes observed by the camera 408.

If the light intensity at the peak position is less than a predetermined threshold value Th1, it may be determined that the crystal unit 100C is normal, and if the light intensity at the peak position is equal to or greater than the predetermined threshold value Th1, it may be determined that there is an abnormality in the crystal unit 100C. This determination may be realized manually, or may be executed by a computer. The predetermined threshold value Th1 may be set, for example, as illustrated in FIG. 15, based on a relationship between the state of the crystal unit 100C and the density (light intensity) of the moire fringes derived in advance by a test. For example, in FIG. 15, the light intensity when the crystal unit 100C is destroyed (e.g., when the amplitude is zero) is represented as a point P1, and the light intensity when the crystal unit 100C is abnormal (e.g., when foreign matter is adhered) is represented as a point P2. In addition, in FIG. 15, the light intensity when the crystal unit 100C is normal is represented as a point P3. In the example illustrated in FIG. 15, the threshold value Th1 is set to a value higher than the point P3 and lower than the point P2 for making it possible to determine the light intensity between the point P3 and the point P2.

Thus, according to the method of measuring the characteristics according to Embodiment 2, the amplitude of vibration of the crystal unit 100C may be measured from the outside by irradiating light to the upper excitation electrode 21C of the crystal unit 100C and analyzing the reflected light. Therefore, it is also possible to measure the amplitude of vibration of, for example, the crystal unit 100C in the mounted state. As the oscillation amplitude becomes measurable, it is also possible to compare the characteristics with those of good quality products.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of measuring characteristics of a crystal unit, comprising:
    driving a crystal unit having a cover transmitting light, a crystal substrate, a first excitation electrode disposed on a first surface of the crystal substrate facing the cover, and a second excitation electrode disposed on a second surface of the crystal substrate opposite to the first surface;
    irradiating light to the first excitation electrode through the cover in the driving state of the crystal unit; and
    measuring vibration characteristics of the crystal unit based on reflected light obtained from the irradiated light,
    wherein an edge of the first excitation electrode and a portion of the crystal substrate adjacent to the edge in a vibration direction of the crystal substrate are simultaneously irradiated with light.

2. A method of measuring characteristics of a crystal unit, comprising:
    driving a crystal unit having a cover transmitting light, a crystal substrate, a first excitation electrode disposed on a first surface of the crystal substrate facing the cover, and a second excitation electrode disposed on a second surface of the crystal substrate opposite to the first surface;
    irradiating light to the first excitation electrode through the cover in the driving state of the crystal unit; and
    measuring vibration characteristics of the crystal unit based on reflected light obtained from the irradiated light,
    wherein the first excitation electrode has a hole, and
    wherein an edge around the hole of the first excitation electrode and a portion of the crystal substrate adjacent to the edge in a vibration direction of the crystal substrate are simultaneously irradiated with light.

3. The method according to claim 2, wherein the hole is formed at a position closer to a center of the first excitation electrode than the edge of the first excitation electrode based on the vibration direction of the crystal substrate.

4. The method according to claim 2, wherein the hole is a plurality of slits or a single hole.

5. The method according to claim 1, wherein the vibration characteristics of the crystal unit are measured by analyzing a frequency of temporal variation of an amount of the reflected light.

6. A method of measuring characteristics of a crystal unit, comprising:
    driving a crystal unit having a cover transmitting light, a crystal substrate, a first excitation electrode disposed on a first surface of the crystal substrate facing the cover, and a second excitation electrode disposed on a second surface of the crystal substrate opposite to the first surface;
    irradiating light to the first excitation electrode through the cover in the driving state of the crystal unit; and
    measuring vibration characteristics of the crystal unit based on reflected light obtained from the irradiated light,
    wherein a plurality of first slits are formed on the first excitation electrode,
    wherein a plurality of second slits are formed on the second excitation electrode to intersect the first slits when viewed in a direction perpendicular to the surface of the crystal substrate, and
    wherein a range in which the first slits are formed on the first excitation electrode is irradiated with light.

7. The method according to claim 6, wherein the vibration characteristics of the crystal unit are measured by analyzing a density of moire fringes formed by the reflected light.

8. The method according to claim 7, wherein the analyzing of the density of the moire fringes comprises determining whether a value representing the density of the moire fringes is equal to or greater than a predetermined threshold value.

9. The method according to claim 7, wherein the analyzing of the density of the moire fringes comprises determining whether a value representing the density of the moire fringes is equal to or greater than a predetermined threshold value and determining that there is an abnormality in the crystal unit if the value representing the density of the moire fringes is equal to or greater than the predetermined threshold value.

* * * * *